United States Patent [19]

Montana et al.

[11] Patent Number: 4,499,468
[45] Date of Patent: Feb. 12, 1985

[54] RANGE-ONLY MULTISTATIC RADAR SYSTEM

[75] Inventors: Donald M. Montana, New Hartford; Randy S. Herd, Rome, both of N.Y.

[73] Assignee: The United States of America as represented by the Secretary of the Air Force, Washington, D.C.

[21] Appl. No.: 370,234

[22] Filed: Apr. 21, 1982

[51] Int. Cl.³ .............................................. G01S 13/46
[52] U.S. Cl. ..................................... 343/15; 343/463; 343/451
[58] Field of Search ................ 343/15, 463, 5 R, 450, 343/451

[56] References Cited

U.S. PATENT DOCUMENTS

| | | | |
|---|---|---|---|
| 2,709,253 | 5/1955 | Haywood et al. | 393/12 |
| 3,184,739 | 5/1965 | Franklin et al. | 343/15 |
| 3,243,812 | 3/1966 | Williams | 343/12 |
| 3,487,462 | 12/1969 | Holberg | 343/12 |
| 3,812,493 | 5/1974 | Afendyklw et al. | 343/12 R |
| 3,854,132 | 12/1974 | Davies | 343/5 PD |
| 3,953,856 | 4/1976 | Hammack | 343/7.7 X |
| 4,060,809 | 11/1977 | Baghdady | 343/451 |
| 4,207,560 | 6/1980 | Poirier | 340/552 |
| 4,281,327 | 7/1981 | Frazier et al. | 343/12 R |

Primary Examiner—T. H. Tubbesing
Assistant Examiner—Gilberto Barrón, Jr.
Attorney, Agent, or Firm—Donald J. Singer; Stanton E. Collier

[57] ABSTRACT

A range-only multistatic radar system has a plurality of radar stations located in a square grid pattern. Each radar station has a plurality of low power pulsed transmitters and receivers that operate on omnidirection whip antennae. Echo information received by the receivers is transmitted to a computer wherein a technique is employed to deghost and identify real targets. The computer applies a range difference similarity test, a uniqueness test, and a position test to determine real targets from the plurality of echo returns received.

7 Claims, 15 Drawing Figures $$R_{ab} = R_{at} + R_{tb}$$
$$R_{ad} = R_{at} + R_{tb}$$
$$R_{cb} = R_{ct} + R_{tb}$$
$$R_{cd} = R_{ct} + R_{tb}$$
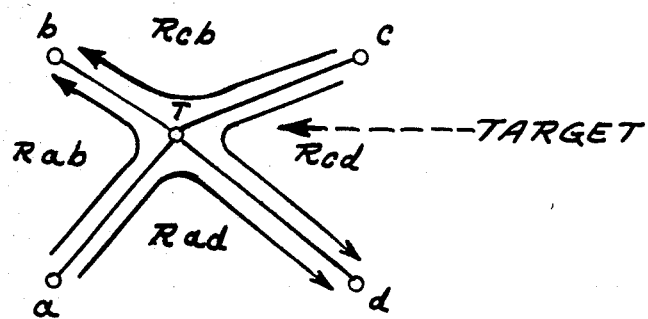
FIG. 5
$$R_{ac} = R_{at} + R_{tc}$$
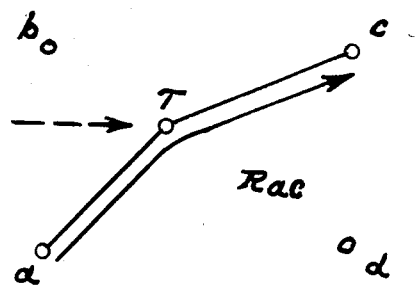
FIG. 6
$$R_{(b-d)i,j} = (R_{at} + R_{tb}) - (R_{at} + R_{td})$$
$$R_{(b-d)i,j} = R_{abi} - R_{adj}$$
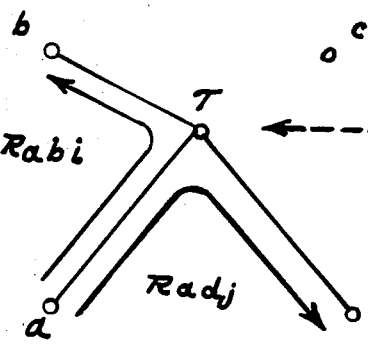
FIG. 7
$$R_{(b-d)i,j} = (R_{ct} + R_{tb}) - (R_{ct} + R_{td})$$
$$R_{(b-d)i,j} = R_{cbi} - R_{cdj}$$
FIG. 8

RANGE-ONLY MULTISTATIC RADAR SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to radar systems, and more particularly, to a multistatic radar system that can be used to determine the coordinates of real targets.

Conventional monostatic radars have been traditionally employed to detect and track targets, such as aircraft. Normally these radars are limited to line-of-sight tracking above ground clutter. Further limitations such as cost, power consumption, manning, and terrain preclude use in many desireable locations. The over-the-horizon backscatter (OTH-B) radar has been developed to detect aircraft at long ranges, such as several thousand miles beyond the line-of sight, but the high cost and the tremendous power consumption of this system severely limits its wide spread use. Further, this system requires a very complex and costly computer system to calculate multiple doppler returns to find real targets. This radar has a receiver site distantly located, hundreds of miles, from the transmitter site. The antennae used are fixed and beam steering is accomplished electronically to cover the desired area of interest.

To accurately locate targets, a multistatic radar system employing a plurality of receivers and transmitters can be used. This system has either a pulse-echo or a phase comparison mode to obtain target information, and is normally limited to line-of-sight targets because ghost targets formed would overburden tracking equipment.

There currently exists, therefore, the need for a multistatic radar system capable of detecting a plurality of targets and deghosting false targets. The present invention is directed toward statisfying that need.

SUMMARY OF THE INVENTION

This invention overcomes many of the above limitations by providing a means of implementing a multistatic radar system capable of obtaining high quality position information on aircraft flying close to the surface of the ground and below the coverage of conventional radars.

In combination with a unique placement of transmitters and receivers, a multi-target correlation technique is capable of real-time deghosting of false-target correlations inherent in all multistatic radar systems. This technique eliminates false-target correlations, known as deghosting, sorts sets of bistatic range measurement data for real targets, and computes the position in rectangular coordinates for these real targets. This technique employs only bistatic range measurement data collected by bistatic receiver stations from transmitter stations. All of the multistatic transmitter and receiver stations employ omnidirectional antennae. Neither angle information or doppler measurement information is employed in any of the correlation processes or in the target position computation. The correlation technique and position computation are performed using a single set of bistatic range measurements and requires no operator's knowledge of the targets nor any prior history of the targets' position or velocity.

The basic unit of this range-only multistatic radar system is a square shaped pattern having two omnidirectional transmitters, operating on different frequencies, located on the opposite diagonal corners of the square pattern, and having one receiver collocated with one transmitter and two receivers located on each of the other diagonal corners. A plurality of these units can be grouped to provide wider coverage both horizontally and vertically.

One object of this invention is to provide a range-only multistatic radar system for detecting low flying aircraft;

Another object of this invention is to provide a range-only multistatic radar system capable of real time deghosting a plurality of targets;

Another object of this invention is to provide a range-only multistatic radar system having a technique of developing two sets of mutually-similar information from two sets of independent measurements for eliminating false correlations based upon the similitude and uniqueness of these mutually-similar sets of information; and Another object of this invention is to provide a range-only multistatic radar system wherein no new false correlations nor false solutions are generated due to multiple root solutions resulting from the correlation method used.

These and many other objects and advantages of the present invention will be readily apparent to one skilled in the art to which the invention pertains from a reading of the detailed description of the preferred embodiment and the claims when considered in conjunction with the drawings.

BRIEF DESCRIPTION OF THE DRAWINGS

FIGS. 5-8 illustrates a target within radar coverage; and

DETAILED DESCRIPTION OF THE PREFERRED EMBODIMENT

The range-only multistatic radar system of this invention is directed to solving the problems noted hereinabove. The radar system includes a plurality of transmitter/receiver towers positioned in a rectangular grid pattern. The transmitters are low power pulsed and use an omnidirectional antenna.

The receivers use an omnidirectional antenna to receive echos from targets, real or ghost. The echo information is sent to a computer for processing. A technique is employed therein to deghost the targets that appear in the multistatic radar system of this invention.

Figure 1:
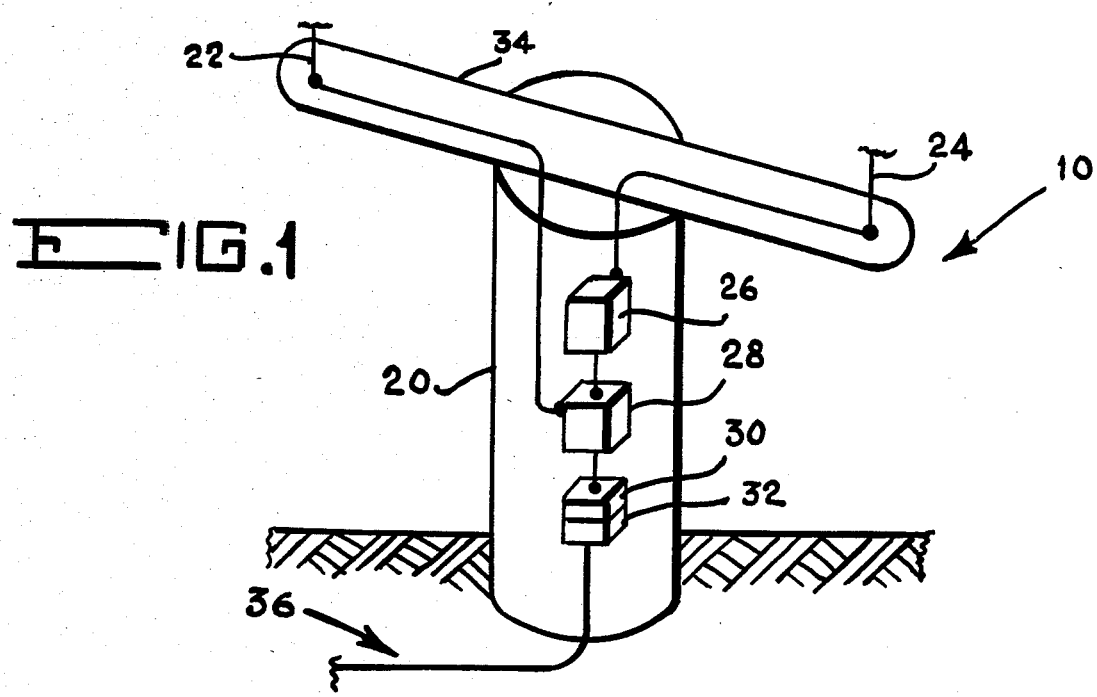
FIG. 1 is a pictorial view of a multistatic radar station of this invention.

Reference is made to FIG. 1 which illustrates a radar station 10 the invention. A plurality of stations 10 are arranged in a rectangular grid pattern as shown in FIGS. 2 or 3.

Figure 2:
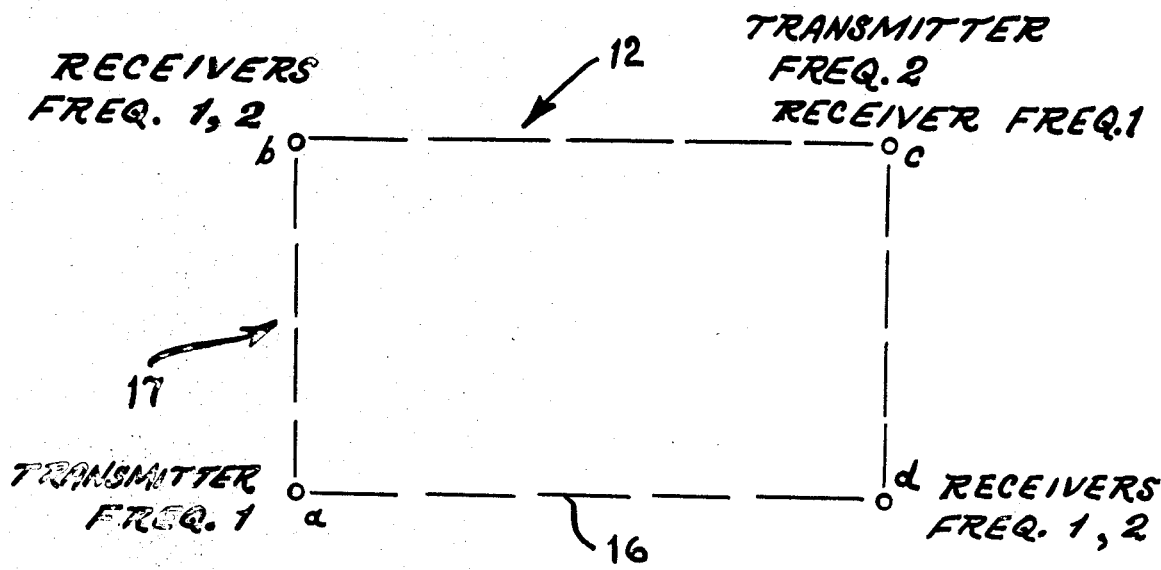
FIG. 2 is a plan view of the multistatic radar system of this invention.

FIG. 2 illustrates a preferred arrangement wherein five receivers and two transmitters are located at the positions shown on the corners of a square having a side 16 of about three kilometers in length. A radar system 12 includes four radar stations 10 as a minimum.

Figure 3:
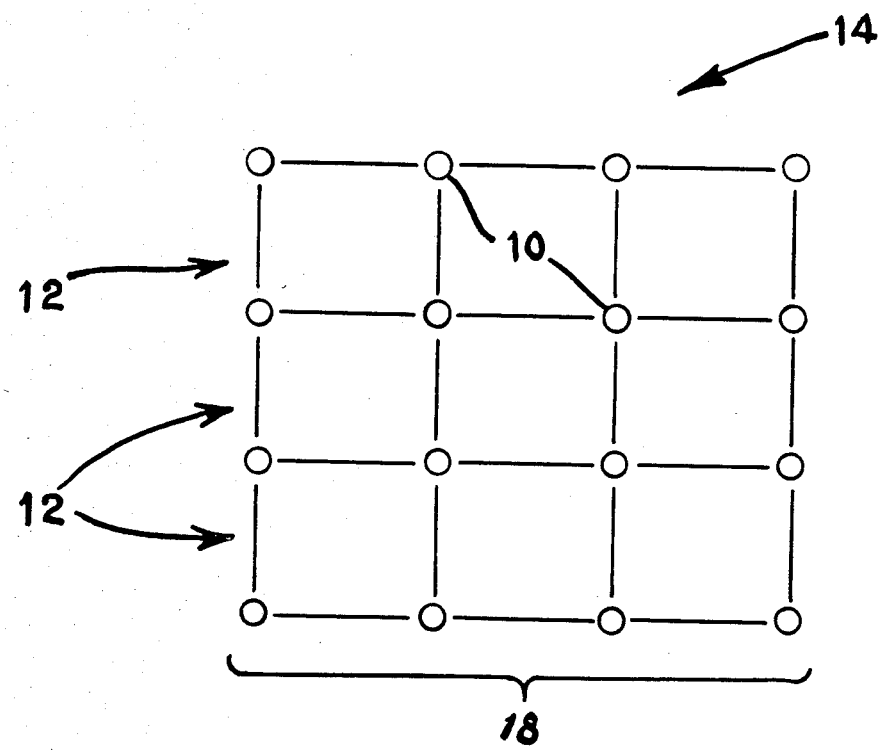
FIG. 3 is a plan view of an extended multistatic radar system arranged according to this invention.
Figure 9:
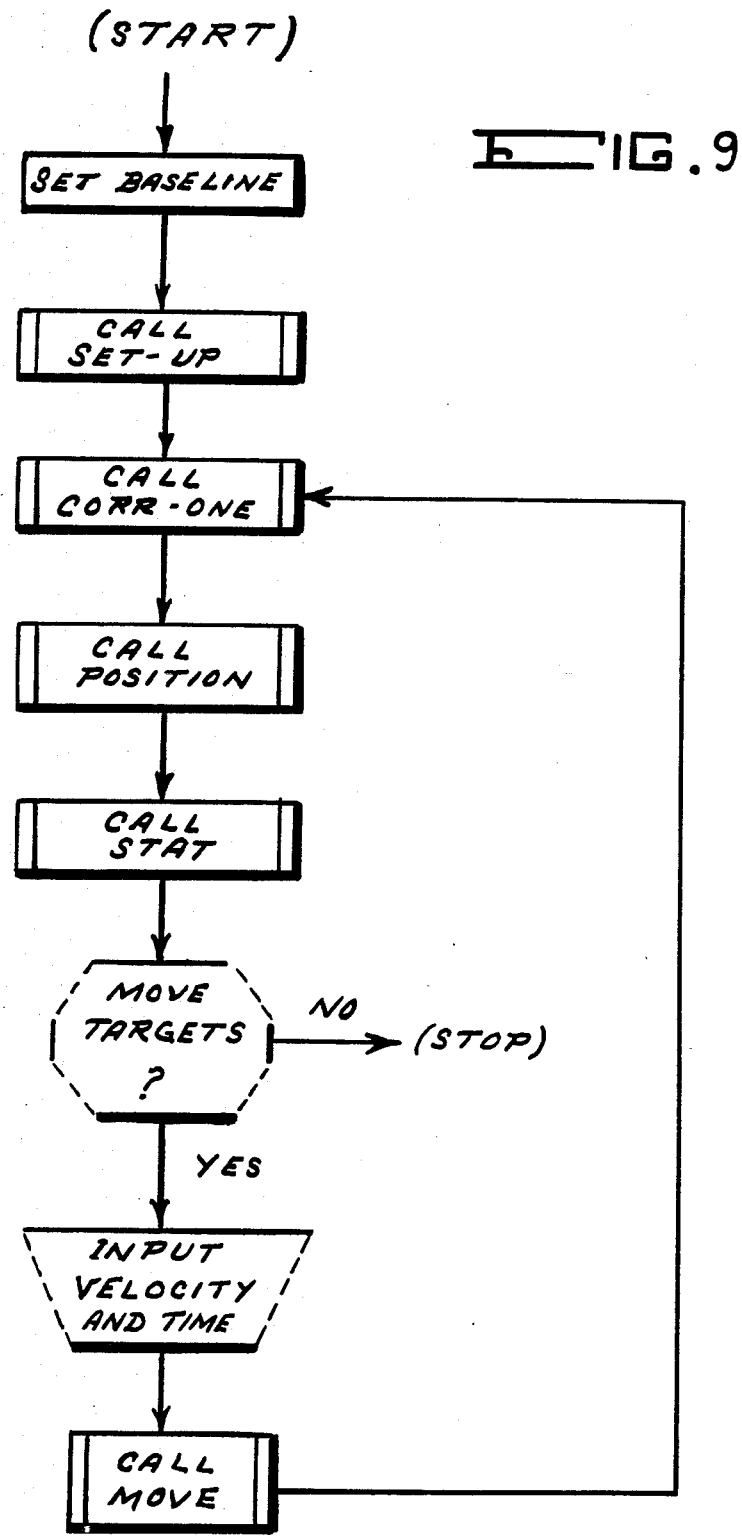
FIGS. 9-14 illustrates various flow charts of a program implementing the deghosting techniques of this invention.
Figure 10:
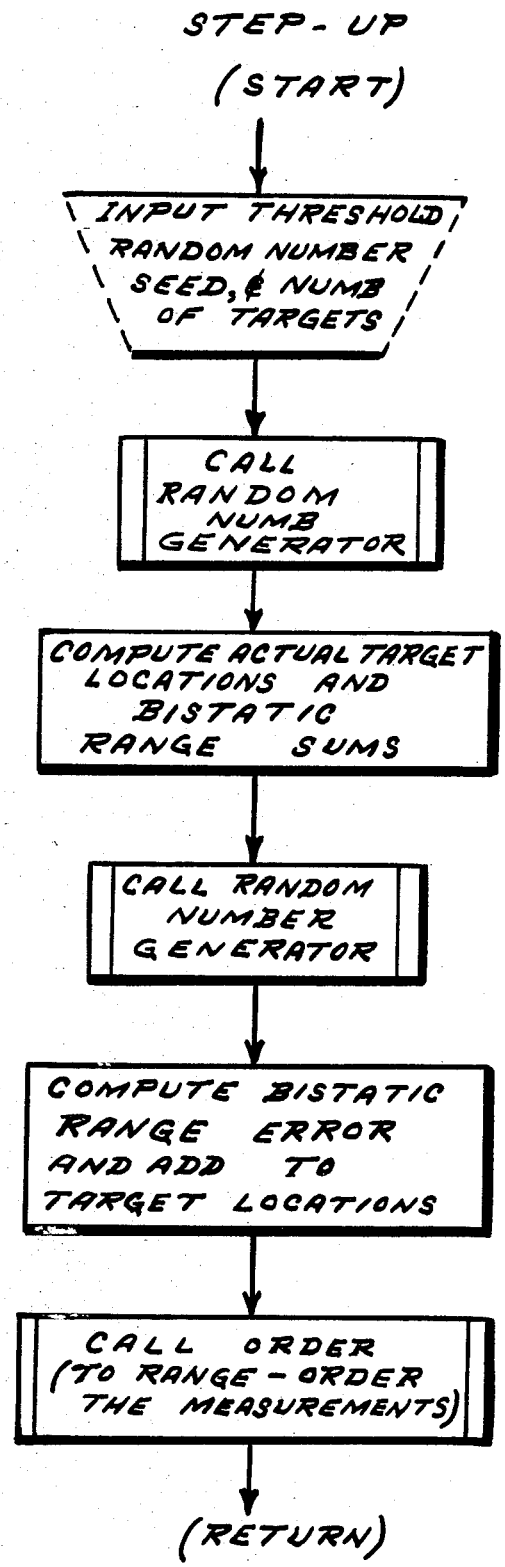
Figure 11A:
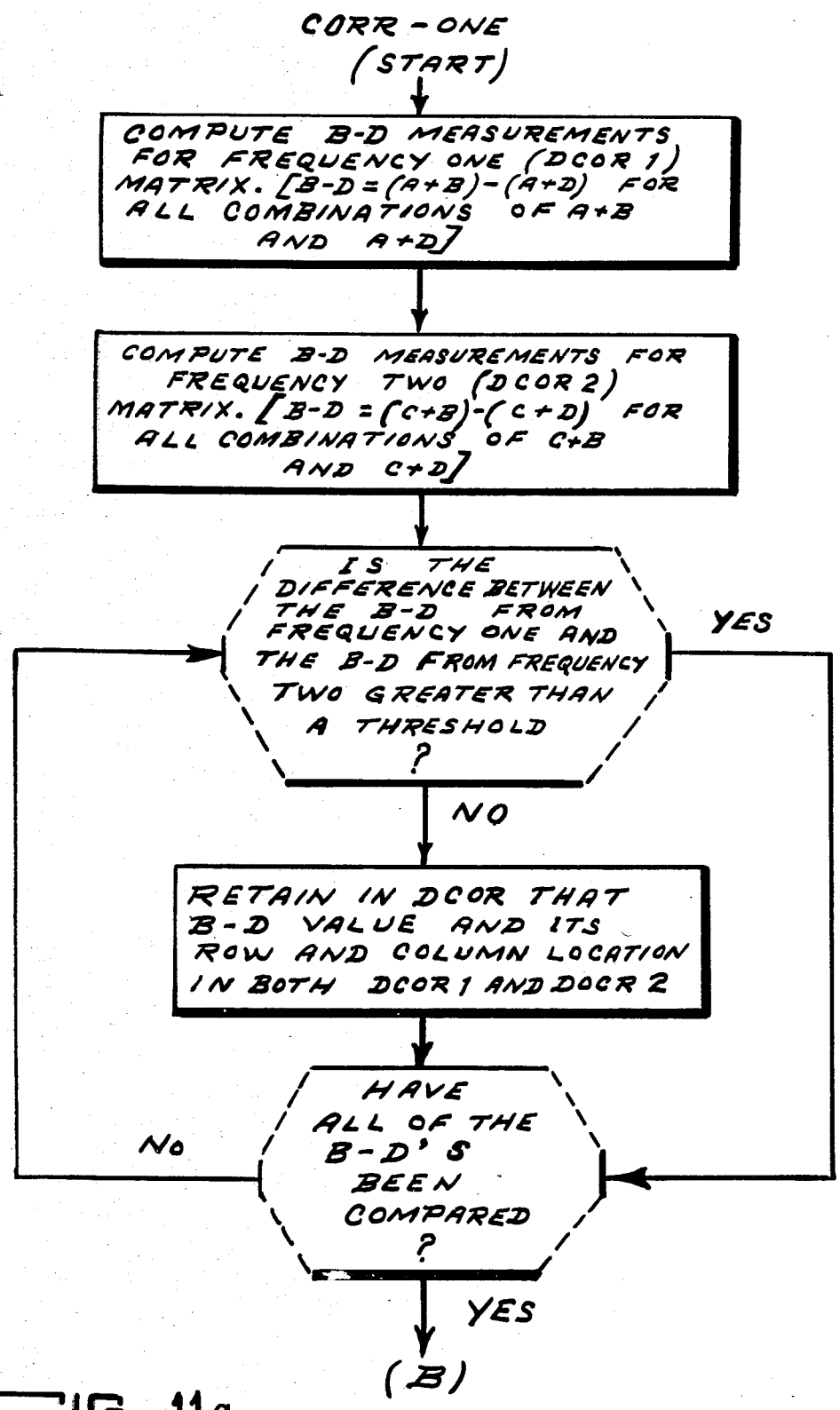
Figure 11B:
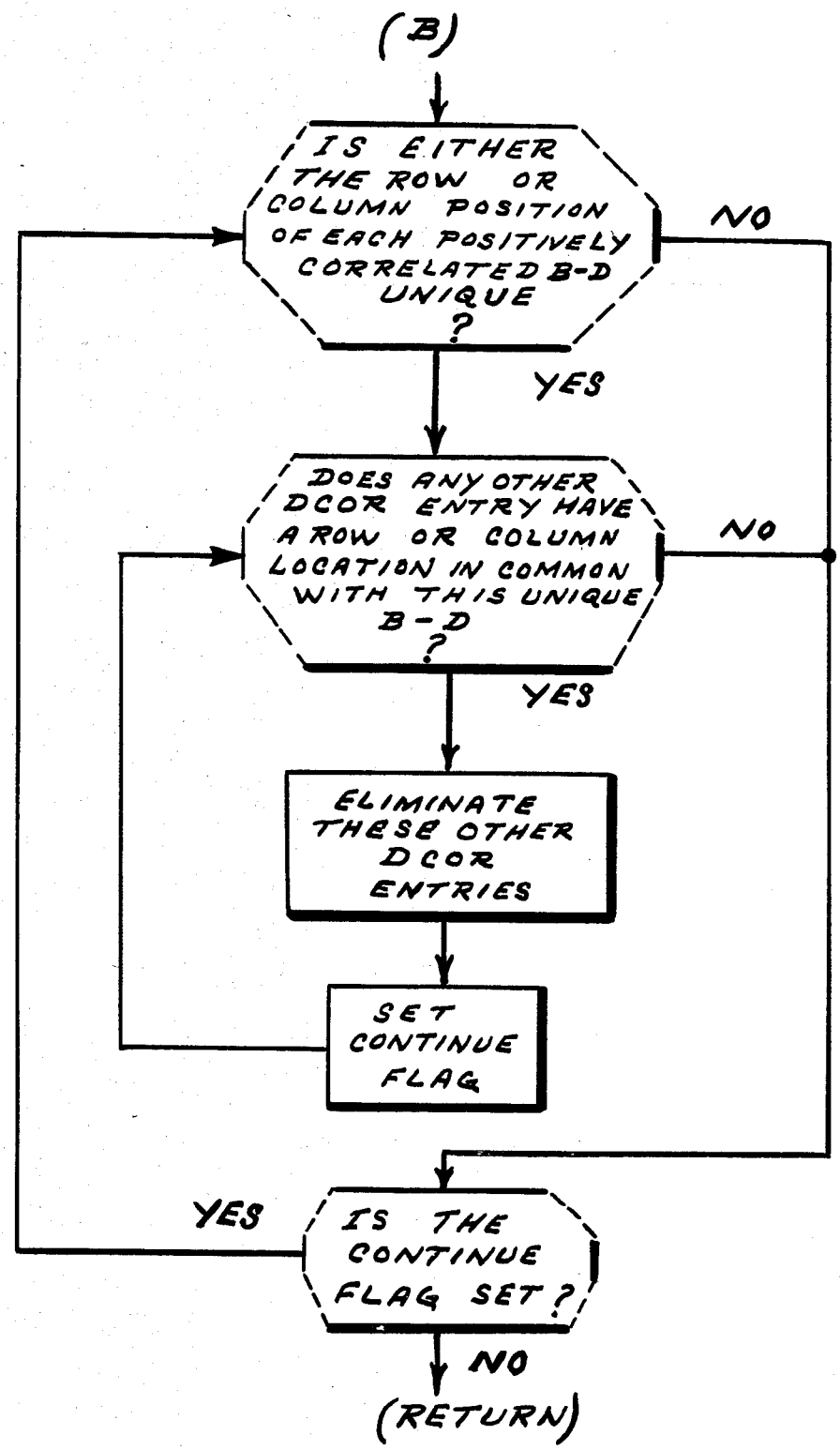
Figure 12:
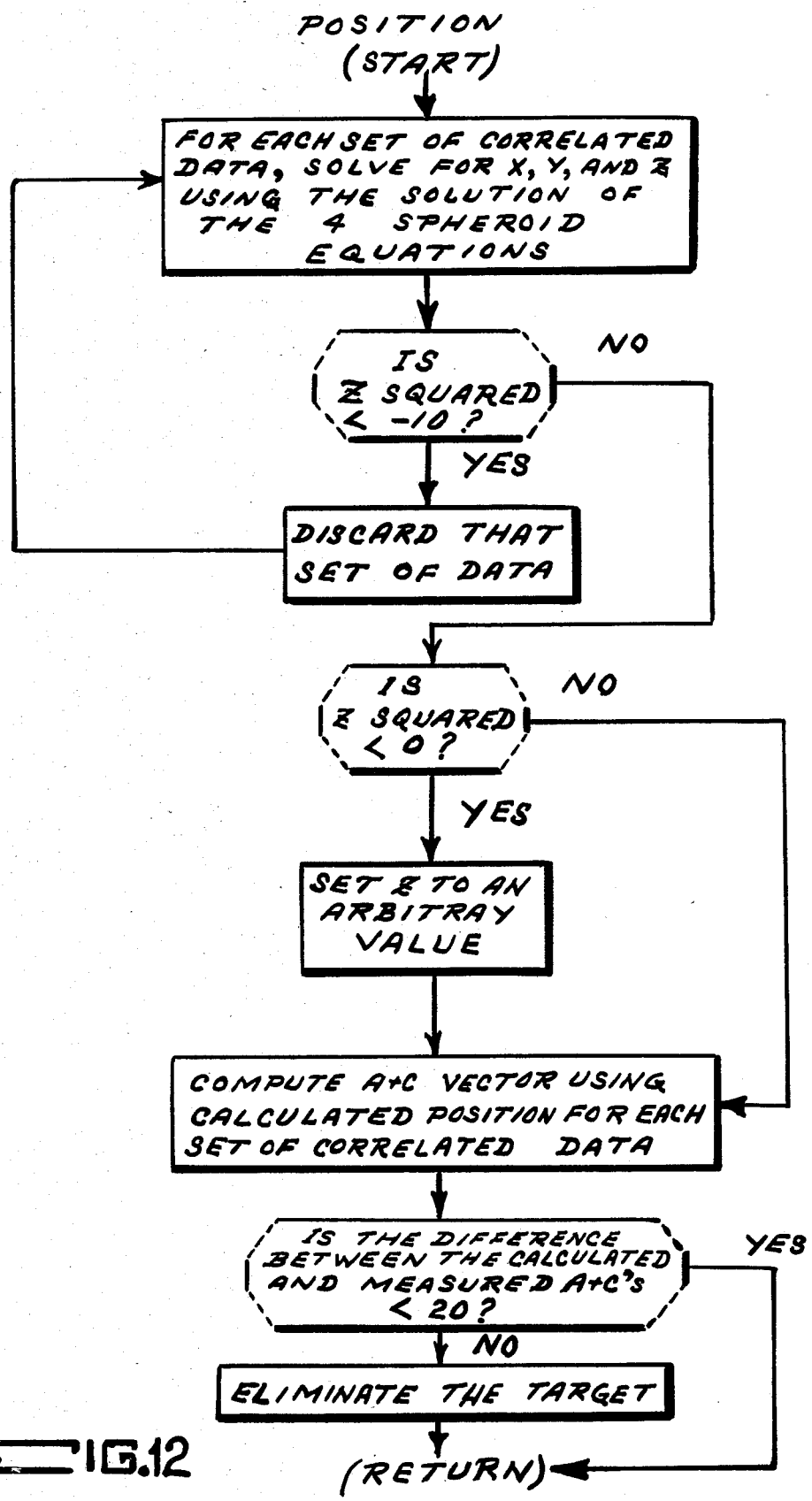
Figure 13:
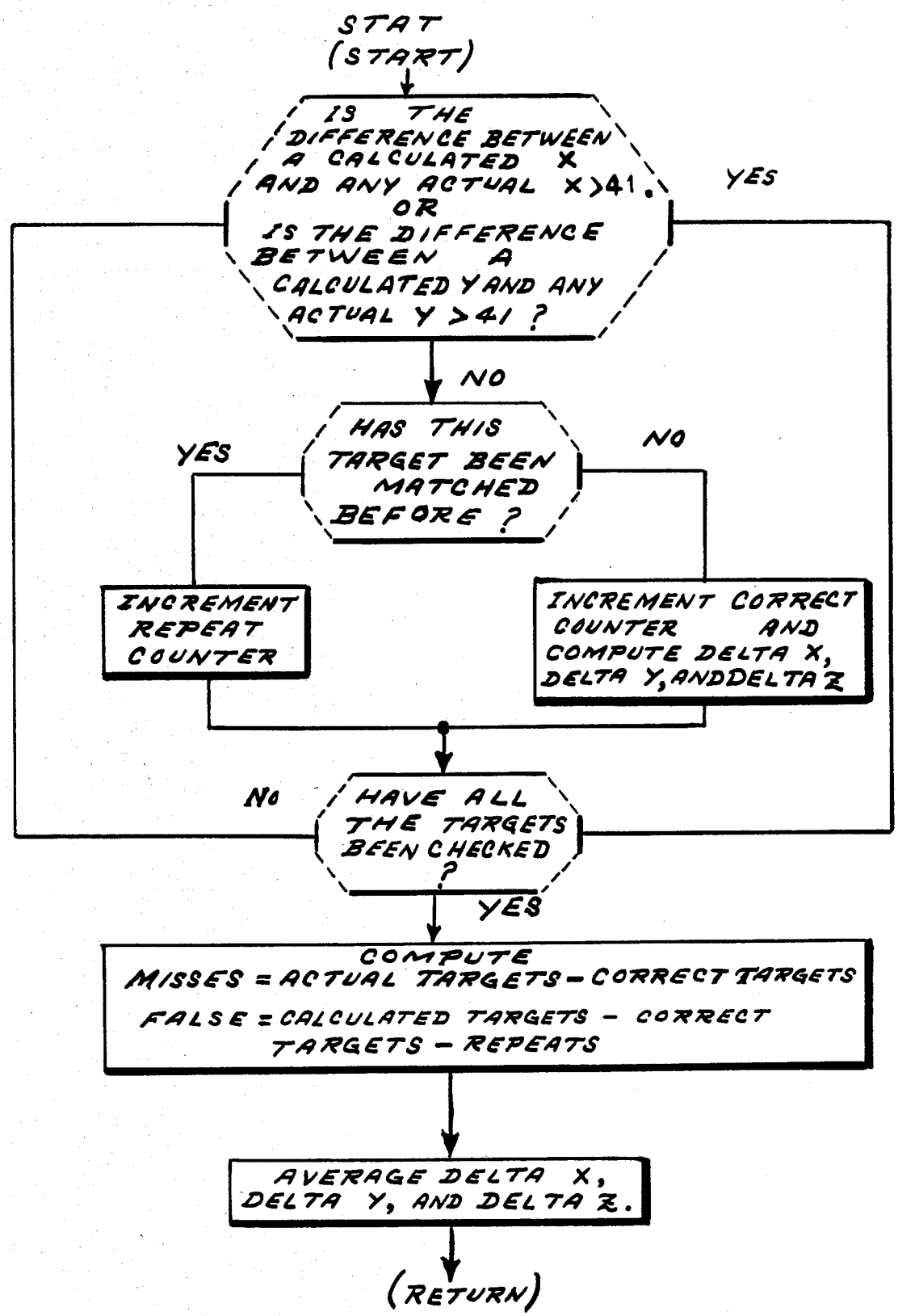
Figure 14:
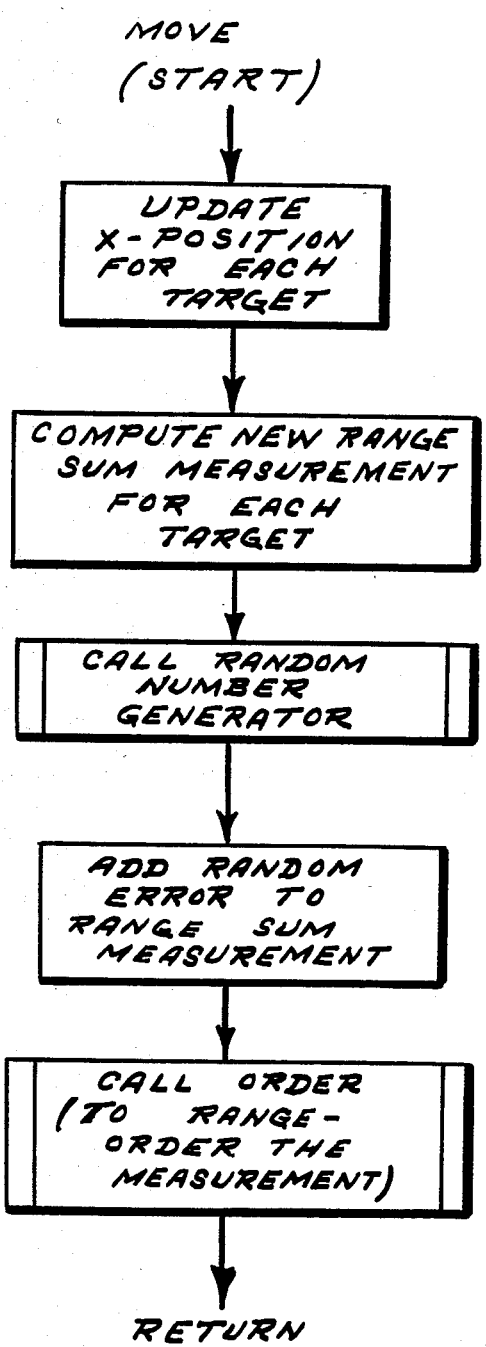

FIG. 3 illustrates a preferred arrangement wherein nine radar systems 12 are incorporated into an extended radar system 14. The distance to the nearest adjacent radar station 10 is approximately three kilometers making extended radar system 14 approximately 9 kilometers on an extended side 18. The three kilometer distance between radar stations 10 is based on a transmitter power of about 10 watts. Thus, depending on the actual power of the transmitters, this distance could be either longer or shorter. The type of intended target whether a bomber or a cruise missile has a bearing also upon this distance and must be taken into account in the final design.

Radar stations 10 include a support tower 20, a receiver antenna 22, a transmitter antenna 24, a plurality of transmitters 26, a plurality of receivers 28, a control unit 30, a power supply 32, an antennae support 34, and an interconnecting cable 36.

As stated earlier, antennae 22 and 24 are omnidirectional antennae. For purposes of redundancy, there are at least two transmitters 26 and at least two receivers 28 per radar station 10. Control unit 30 insures that the backup unit is placed on-line when there is a failure. Power supply 32 can be a rechargeable unit having a power line thereto from a central power supply (not shown), or conventional solar cells for maintaining charge level, or a conventional wind-powered unit, or a combination of any of the above depending on the location. The receiver data is transmitted over interconnecting cable 36 to a central location where a computer 38, FIG. 4, processes the receiver data.

FIG. 2 illustrates a preferred embodiment of radar system 12. Two receivers operating on a first and a second frequency are located on corners b and d of a square 17. Another receiver operating on the first frequency is on corner c. One transmitter operating on the first frequency is located on corner a. Another transmitter operating on the second frequency is located on corner c.

This arrangement will be used throughout the following description; however, radar system 12 could have used any other arrangement of the locations of the transmitters and receivers. A different arrangment would necessitate alteration in the following notation. The length of side 16 is about three kilometers but can vary depending on intended targets, terrain, etc. Using a transmitter of about 10 watts, a range of about 7 kilometers is achieved from the center of square 17. Aircraft can be detected at an altitude from about 50 meters to 300 meters using radar system 12 using a technique hereinafter disclosed.

FIG. 3 illustrates extended radar system 14 having nine radar systems 12 therein. This system would have both increased range and an altitude coverage from about 50 to 20,000 meters.

Figure 4:
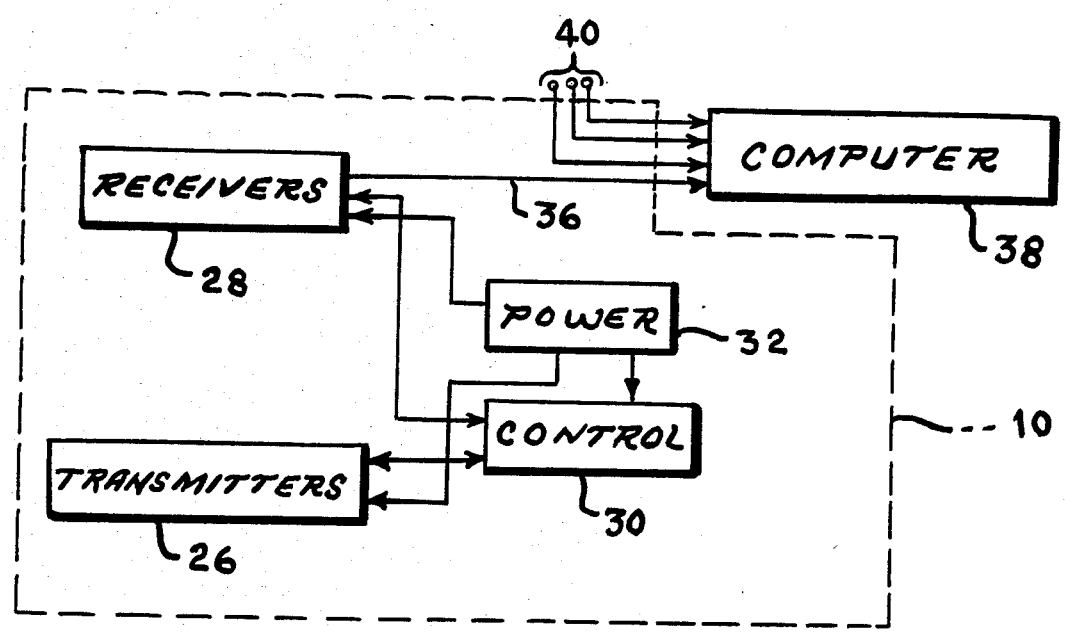
FIG. 4 is an electronic block diagram of the multistatic radar system of this invention.

FIG. 4 illustrates an electronic block diagram of radar station 10, one of four used in radar system 12 of FIG. 2.

Referring to FIG. 1, a transmitter 26 sends out a pulsed omnidirectional low power signal. Receiver 28 receives with an omnidirectional antenna echo signals on a predetermined frequency. Echo signals received are transmitted to a computer 38 wherein a correlation and deghosting technique is performed. Control 30 monitors both receivers 28 and transmitters 26 as to operating condition. If one fails, a backup is put on-line if there is one available. For example, radar station 10 may have two transmitters and three receivers, or radar system 10 may require only one transmitter, or two receivers, or one transmitter and one receiver. Control 30 provides a backup unit in all cases until maintenance personnel replace the bad unit based on failure information transmitted to computer 38 for identification purposes via interconnecting cable 36. When operating as extended radar station 14, other radar stations 10 sent echo information to computer 38 via interconnecting cables 40 as shown in FIG. 4. The echo information received by computer 38 is used to correlate and deghost targets as described hereinafter.

The following multiple target correlation technique is capable of real-time deghosting of false targets, and the sorting and position computing of real targets using only bistatic range measurement information. No angle measurements are performed in the multistatic radar system since all of the antennae used are omnidirectional. Thus, no angle data is used in the correlation, in data sorting or in the computation of target position.

Referring to FIG. 2, the two transmitters are operated on different carrier frequencies to provide two independent sets of bistatic range measurements which inherently associate sets of measurements by frequency channel. At corner c, a bistatic receiver is operating at the frequency of the transmitter at corner a. Additionally, receivers at corners b and d operate on the frequency of the transmitter at a. Also, receivers at corners b and d operate on the frequency of the transmitter at corner c. Thus, a total set of five bistatic range measurements are provided. For example, a bistatic range measurement for a signal transmitter from corner a to a target and received at corner b will be designated Rab. The subset of bistatic range measurements associated with the transmitter at corner a are then Rab, Rac, and Rad, while the subset associated with transmitter corner c are Rcb and Rcd as shown in FIGS. 2, 5, and 6.

The bistatic range measurements obtained at each of the receiver stations are received in a geometry dependent range ordered fashion and not directly associated with any particular target. This becomes a serious problem when more than one target enters the surveillance volume simultaneously. A multiple target correlation process is employed to sort sets of bistatic range measurements by target as a prerequisite to the computation of the position of the individual targets present. This correlation process employs four of the independent bistatic range measurements in the first step of the correlation process. The total number of possible targets to be correlated in this first step of this process is equal to the number of real targets raised to a power equal to the number of independent measurements used.

In this illustration if 10 targets enter the surveillance volume simultaneously and four independent bistatic range measurements are used, then 10 to the fourth or 10,000 possible targets will result. Of these, 10 targets are real and the remainder or 9,990 targets are false. The 9,990 false targets designated as ghosts must be eliminated and the bistatic range measurements for the 10 real targets must be sorted into subsets associated with each of the real targets.

The first step of the correlation process involves the correlation of bistatic range differences. This is a test of range difference similarity called the Dcor similarity test. Referring to FIGS. 7 and 8, the range differences used in this test are formed from subset Rab and Rad associated with transmitter a and a subset Rcb and Rcd associated with transmitter c. Within each subset, bistatic range difference calculations result in two similar sets of range differences R(b−d)ij, independently. In Dcor 1 range differences, R(b−d)ij, are produced by substracting Radj from Rabi. Similarly, in Dcor 2 range differences, R(b−d)ij, are produced by subtracting Rcdj from Rcbi, where i is the ith row and j is the jth column of Dcor 1 or Dcor 2.

To clarify this description, the significance of i and j will be explained in a pulsed radar system where a single pulse is transmitted by both of the transmitters at corners a and c. A set of pulses (or echoes) is received at the receiver at corner b as a result of the pulse transmitted from the transmitter at corner a. The first echo received was reflected from a target whose bistatic range was the shortest. This resulted in a bistatic range measurement, Rabi. Since this Rabi bistatic range measurement was the first one received, i is equal to one. Likewise, for the second bistatic Rabi range measurement received, i is equal to two, and so on. For the same set of targets a set of echos is received at the receiver at corner d also as a result of the same pulse transmitted from the transmitter at corner a. The echo received at the receiver at corner d first was reflected from the target whose bistatic range was shortest. This resulted in an Radj bistatic range measurement where j is equal to one. For the second Radj measurement j is equal to two, and so on. The values of i and j both equal to one. For the Rabi and Radi bistatic range measurements only signify that each measurement was the first to occur and are not necessarily associated with either target number one nor are they necessarily associated with the same target.

TABLE 1
DCOR 1 FOR RANGE ORDERED DATA

| i | j | | | |
|---|---|---|---|---|
|  | Rad1 | Rad2 | Rad3 | Rad4 |
| Rab1 | R(b–d)11 | R(b–d)12 | R(b–d)13 (Target 1) | R(b–d)14 (Ghost 1) |
| Rab2 | R(b–d)21 | R(b–d)22 | R(b–d)23 | R(b–d)24 (Target 3) |
| Rab3 | R(b–d)31 | R(b–d)32 (Target 2) | R(b–d)33 | R(b–d)34 |
| Rab4 | R(b–d)41 (Target 4) | R(b–d)42 (Ghost 2) | R(b–d)43 | R(b–d)44 |

NOTE:
The values of i and j refer only to the order of magnitudes of bistatic range measurements. For Target 1 Rab1 was the shortest Rab measurement, while Rad3 was the third shortest Rad measurement. i.e. i = 1 and j = 3.

TABLE 2
DCor 2 FOR RANGE ORDERED DATA

| i | j | | | |
|---|---|---|---|---|
|  | Rcd1 | Rcd2 | Rcd3 | Rcd4 |
| Rcb1 | R(b–d)11 | R(b–d)12 | R(b–d)13 | R(b–d)14 (Target 2) |
| Rcb2 | R(b–d)21 (Ghost 1) | R(b–d)22 (Target 3) | R(b–d)23 (Ghost 2) | R(b–d)24 |
| Rcb3 | R(b–d)31 (Target 4) | R(b–d)32 | R(b–d)33 | R(b–d)34 |
| Rcb4 | R(b–d)41 | R(b–d)42 | R(b–d)43 (Target 1) | R(b–d)44 |

In the sets of range differences, R(b−d)ij, is the values of i and j are a result of the range order in which they were received. Referring to Tables 1 and 2, these range differences are arranged in Dcor 1 and Dcor 2 logically in matrix format. In Dcor 1 the rows are ordered by bistatic range measurements Rabi. While the columns are ordered by Radj. Similarily, the rows and the columns of Dcor 2 are ordered by bistatic range measurements Rcbi and Rcdj, respectively. A comparison test of the Dcor 1 and the Dcor 2 range differences is performed on an element-by-element basis for the occurrence of similar R(b−d)ij range difference values. The threshold used as a criteria for the similarity test is based on the estimated random and bias range measurement errors for a conventional radar system. The Dcor similarity test typically reduces the number of possible targets from 10,000 to about 40, which includes the 10 real targets and a residue of about 30 false targets or ghosts. The range differences which satisfy the Dcor similarity test are then carried forward to the second correlation process which is called the uniqueness test.

TABLE 3
HKEEP FOR FIRST PASS

| | From DCor 1 | | | Status | | From DCor 2 | |
|---|---|---|---|---|---|---|---|
| Row | R(b–d)ij | i | j | Before | After | i | j | R(b–d)ij |
| 1 | R(b–d)13 | 1 | 3 | 0 | 1 | 4 | 3 | R(b–d)43 |
| 2 | R(b–d)14 | 1 | 4 | 0 | −1 | 2 | 1 | R(b–d)21 |
| 3 | R(b–d)14 | 1 | 4 | 0 | −1 | 2 | 4 | R(b–d)24 |
| 4 | R(b–d)24 | 2 | 4 | 0 | 1 | 2 | 2 | R(b–d)22 |
| 5 | R(b–d)32 | 3 | 2 | 0 | 1 | 1 | 4 | R(b–d)14 |
| 6 | R(b–d)41 | 4 | 1 | 0 | 1 | 3 | 1 | R(b–d)31 |
| 7 | R(b–d)42 | 4 | 2 | 0 | −1 | 2 | 3 | R(b–d)23 |
| 8 | R(b–d)42 | 4 | 2 | 0 | −1 | 2 | 4 | R(b–d)24 |

Illustrates conditions from Tables 1 and 2.
Two status columns indicate Hkeep status before and after first uniqueness test.

In the uniqueness test, the range differences carried forward from Dcor 1 and Dcor 2 similarity tests are loaded into a housekeeping file called Hkeep. The columns of the left half of Hkeep contain the Dcor 1 range difference values and their row (i) and column (j) locations from Dcor 1. Similarly, the columns of the right half of Hkeep contain the Dcor 2 range difference values and their row (i) and and column (j) locations from Dcor 2. The rows of Hkeep contain all of the range differences which were carried forward from the Dcor similarity test for all real targets and ghosts correlated. The task at this point is to determine which rows are to be associated with real targets and to eliminate all rows associated with ghosts.

The center column of Hkeep contains a status column where a flag is initially set to zero (0) in all of the rows indicating that initially no correlated target has been associated as either a real target or a ghost. During the uniqueness test, when a target is declared real, the status flag will be set to one (1). When a target is declared a ghost, the status flag will be set to a minus one (−1).

Referring to Table 3, since a bistatic range measurement, Rabi, for a real target is correctly associated with a range difference in only one row location in Dcor 1 and the bistatic range measurement, Radj, for the same real target is correctly associated with the same range difference in only one column of Dcor 1, there is a unique row/column location for each real target in Dcor 1. The same is true for targets contained in Dcor 2. However, a real target will have a different unique row/column location in the two Dcor matrices. If a range difference similarity correlation occurs in a single row in either the right side or the left side of Hkeep, this is an indication that this correlation has occured in one and only one row or column location of one of the Dcor matrices. This range difference similarity has then been declared unique and, thus, is associated with a real target. Its status flag is then set to (1) which declares that the Dcor 1 row/column location and the Dcor 2 row/column location contained in this row of Hkeep is the location of a real target. All of the other range differences in other rows of Hkeep with the same i and j values are declared locations of ghosts and the status flags in these rows are set to $(-1)$).

This process is illustrated in Tables 1, 2, and 3. In Table 1, four targets are illustrated where (i,j) values are target 1 (1,3); target 2 (3,2); target 3 (2,4) and; target 4 (4,1). Also Table 1 contains ghost 1 (1,4) and ghost 2 (4,2). However, none of the 16 possible R(b−d) values have as yet been declared as being either targets or ghosts. In Dcor 2, FIG. 2, R(b−d)43 has been found similar in value to R(b−d)13 in Dcor 1, Table 1. This similarity association is thus the first to be transferred in row 1 of Hkeep, Table 3, and its status flag is set to (0). The next similarity transferred to row 2 of Hkeep is Dcor 1 R(b−d)14 paired with DCor 2 R(b−d)21. The third similarity found paired is R(b−d)14 from Dcor 1 and R(b−d)21 from Dcor 2. The third similarity found paired is R(b−d)14 from DCor 1, and R(b−d)24 from DCor 2, which is transferred to row 3 of Hkeep, Table 2. Other similarities between values of R(b−d) from Dcor 1, Table 1, and DCor 2, Table 2, are transferred into rows 4, 5, 6, 7 and 8 of HKeep, Table 3. Status flags for all rows of Hkeep are initially set to (0), indicating no targets have yet been declared as either real targets or ghosts.

The uniqueness test is implemented by simply examining the i and j column values in both the left and right halves of Hkeep. In the first three rows of the left half of Hkeep, $i=1$ occurs 3 times. Therefore, this is not a unique occurence; however, $j=3$ occurs in only one row and is therefore a unique occurence. The status flag in row 1 is then set to (1). All other rows in the left half of Hkeep with an $i=1$ or a $j=3$ are set to $(-1)$. Also, all other rows in the right half of Hkeep with an $i=4$ or a $j=3$ are set to $(-1)$. Thus, in rows 2, 3 and 7, the status flags are set to $(-1)$ and these rows are declared locations of ghosts. After a row has its status flag set to $(-1)$ it is eliminated from the correlation process uniqueness test.

The next row to be examined in Hkeep is row 4 where $i=2$ is found to occur in no other row. This unique row is thus declared the location of a real target and its status flag is set to (1). All other rows in the left half of Hkeep with an $i=2$ or a $j=4$ or in the right half of Hkeep with an $i=2$ or a $j=2$ are set to $(-1)$. Thus, the status flag of row 8 is set to a $(-1)$ declaring this row the location of a ghost. The process continues where $i=3$ is found unique in row 5 and the status flag in row 5 is set to (1). Although $i=4$ appears in rows 6, 7 and 8, rows 7 and 8 have already been eliminated as their status flags were set to $(-1)$. Thus, $i=4$ is found to be unique in row 6 and its status flag set to (1).

Thus, in this illustration by a simple uniqueness test of the occurence of i and j values, rows 1, 4, 5 and 6 were declared location of real targets. All of the real targets were properly correlated and all of the similar values of false targets were declared ghosts.

A potential difficulty, which could occasionally occur, may occur when a unique row/column Dcor location is missing because the measurement which would have produced it was also missing due to maximum range restraints, ground screening or multipath. To test for the possibility of a missing measurement, the measurements whose status flags are initially set to (1) are used to compute the x, y, z position for targets declared unique. Computation of target position is performed by the simultaneous solution of the four spheroids generated by the sets of four bistatic range values. The computed target position is then used to compute an Rac value which represents the bistatic range distance from corner a to the target which was declared unique to corner c. This computed Rac value is then compared with the set of actual Rac measurements. If a positive correlation occurs, uniqueness has been confirmed and this uniqueness correlation retains its (1) status. If the computed Rac value does not correlate with any of the Rac measurements, the uniqueness is rejected and the measurement's status flag is reset to (0). This uniqueness test is repeated in all remaining rows of Hkeep to identify other unique row or column occurrences until all of the rows of Hkeep have been examined.

Hkeep is then reduced in size by the elimination of all rows whose status flags were set to $(-1)$. The uniqueness test is reiterated declaring additional real targets and ghosts, updating the status flags and reducing the size of Hkeep until no new real targets nor ghosts can be declared. Typically, by the fifth iteration through Hkeep, 8 out of 10 real targets can be declared, with 4 targets still not identified as either real targets or ghosts. Sets of bistatic range measurements Rab, Rad, Rcb, and Rcd have now been sorted for all of the targets remaining in Hkeep whether real targets or ghosts. These remaining targets, typically 12 in number, are carried forward for position computation and the final correlation step called Fcor.

Using these sorted sets of bistatic range measurement data, the x, y, z position of all targets, whose position was not previously computed during the uniqueness confirmation test, is performed. The occurrence of imaginary roots in the computation of z, or the height of the target, is used as a criteria for the elimination of duplicate solutions, when z squared is less than a negative threshold. An arbitrary small value is assumed for z, when z squared is negative but greater than this threshold. The calculated x, y, z position for each target is then used to compute the bistatic range distance from corner a to each target to corner c. That is, a value for Rac is computed for each target for which Rac has not been computed previously as part of the uniqueness confirmation described in the uniqueness test. In Fcor the measurement set, Rac, is then compared with the computed set, Rac, to identify which of the yet undeclared targest in Hkeep are real targets and which are ghosts. In the event that all of the targets in Hkeep were declared to be real targets prior to the Fcor step, the Rac computation and the Fcor steps are not used.

The invention is summarized by flow charts in FIGS. 9 to 14. Subroutines are shown with a double-bordered rectangle, mathematical processes with a single-bordered rectangle and logical decisions by a figure with sloping dashed sides. The flowcharts illustrate the continuity of the several processes employed and the overall software program architecture which consists of the following five principle subroutines:
(1) Set-Up; (2) Corr-One; (3) Position; (4) Stat; and (5) Move.

A brief description of these subroutines is as follows:
1. Set-Up is used to establish the size of the baseline distances between the transmitter and receiver stations, compute the initial positions of real targets, compute the missed targets, and range order the bistatic range measurement. This subroutine simulates the input data set to be correlated. A Random Number subroutine is resident in Set-Up and also in Move.

2. Corr-One computes the Dcor 1 and Dcor 2 range difference matrices, performs the Dcor similarity test, sets up the Hkeep file and performs the Dcor uniqueness test and confirmation.

3. Position computes the x, y, z position for all targets which are initially declared unique during the uniqueness confirmation and subsequently on those targets not confirmed unique but which survive the uniqueness test and remain in Hkeep, examines and excludes data in z having imaginary roots; computes bistatic range vector Rac; and performs the final Fcor process.

4. Stat performs a statistical evaluation of a run, computes errors in x, y, z for each target, computes the average error for all targets present, and computes and compiles the number of real targets missed and the number of false targets incorrectly correlated.

5. Move applies a velocity vector to each target which moves the targets in new locations prior to returning to the Order subroutine which is resident in the Set-Up subroutine.

A computer simulation/evaluation of this multiple target correlation technique was performed on 84 sets of targets, where each set consisted of 10 randomly positioned targets within the coverage of this multistatic radar system. In addition to the contamination of the data sets via the simulation of random measurement errors, the bistatic range measurement data sets were intentionally subjected to the occurence of missed targets. This was simulated by the deletion of all bistatic range measurements greater than 15 kilometers. These occurences were quasi-random and deleted measurements resulted on up to 7 out of the 10 targets present. Of the total 840 targets simulated missing measurements occured for 233 targets. In the simulation the most stressing case was selected, where all of the targets were positioned at low altitudes between 50 and 300 meters above ground. 98.2% of all 607 targets having complete data sets were currently correlated. As expected, all 233 targets having partial data sets due to the occurence of missed measurements were eliminated during the correlation process since these misses were due to an external fault and not a fault of this correlation technique. Fourteen false targets or only 2.3% of the total number of targets correlated (596 real targets plus 14 false targets) were erroneously correlated. In 72 out of the 84 computer runs, no targets having complete data sets were missed. Eleven targets or 1.8% of the 607 targets having complete data sets were missed. Further, no new false targets were produced due to multiple root solutions resulting from the correlation process. Finally, each of the computer runs was independently performed, whereas in actual field application the few false target correlations and the few target misses which did occur would be resolved by conventional real time target track file correlation and track smoothing methods.

The simulated random errors had uniform distribution and magnitudes between plus and minus 10 meters. The average computed position errors for the 596 targets correctly correlated were 2.96 meters, 2.54 meters, and 43.69 meters in x, y, z respectively. The errors in x and y were actually less than expected. The target height above ground, z, computation had a lower degree of orthogonality due to the low altitude restraint imposed on the position simulation of the targets. However, the propagation of error in z of less than an order of magnitude still represents an excellent height estimate.

Obviously, many modifications and variations of the present invention are possible in light of the above teachings and it is therefore understood that within the scope of the disclosed inventive concept, the invention may be practiced otherwise than specifically described.

What is claimed is:

1. A process of determining real targets from bistatic range measurements in a range-only multistatic radar system having $N^2$ radar stations, $N \geq 2$, located in a grid pattern, said radar system having a plurality of transmitters and receivers, comprising the steps of:
  applying a range difference similarity test to bistatic range differences to determine similar range difference elements;
  applying a uniqueness test to said similar range difference elements;
  computing positions of targets having unique range differences as determined by said uniqueness test; and
  identifying real targets from a real time track file and track smoothing.

2. A process of determining real targets as defined in claim 1 wherein said step of applying a range difference similarity test includes the steps of:
  forming range difference elements for each transmitter based upon ascending bistatic range;
  ordering said elements in matrices, one matrix per transmitter; and
  comparing elements in said matrices for similar values with respect to threshold criteria to form similar threshold elements.

3. A process of determining real targets as defined in claim 2 wherein said step of applying a uniqueness test includes the steps of:
  ordering said similar threshold elements into a file having one column per transmitter and a status column having values therein for indicating whether a target is real, ghost or undetermined;
  determining unique similar threshold values in said file;
  changing status column values to indicate target type;
  computing bistatic range distance of said unique real target to other transmitter positions;
  comparing said computed ranges to actual range measurements to confirm uniqueness; and
  reiterating said uniqueness test until no new real targets or ghosts are disclosed.

4. A process of determining real targets as defined in claim 1 wherein said step of computing positions includes the steps of:
  computing positions of all non-real targets not previously computed;
  computing bistatic range distances from said radar stations to remaining real targets, not previously computed; and
  comparing computed bistatic ranges to actual range measurements to confirm uniqueness of targets not previously disclosed real.

5. A range-only multistatic radar system comprising:
  a plurality of bistatic radar stations positioned in a grid pattern, said radar stations having transmit and receive means wherein each of said radar stations comprises at least one support tower, at least one omnidirectional receiver antenna located on said support tower, at least one omnidirectional transmitter antenna located on said support tower, at least one transmitter located on said support tower, said transmitter feeding said transmitter antennae with pulsed signals, at least one receiver connected to said receiver antennae, control means for connecting transmitters and receivers to said antenna, communicating means for transferring receiver echo information and power means for supplying electrical power to each of said radar stations; and a computer programmed to deghost targets and locate real targets, said computer connected to said receiver means, said computer having input echo information from targets detected by said transmit means.

6. A range-only multistatic radar system wherein said radar system includes four radar stations, one station situated at each corner of a square, a first radar station having one on-line transmitter operating on a first frequency, a second radar station having one on-line transmitter operating on a second frequency and a receiver operating on said first frequency, said second radar station on a diagonal of said square opposite said first radar station, a third radar station having two receivers, one operating on said first frequency and the other operating on said second frequency, and a fourth radar station having two receivers, one operating on said first frequency and the other operating on said second frequency, said third and fourth radar station oppositely located on the other diagonal of said square, and computing means for deghosting and locating targets connected to said receivers, said computing means having echo information input from said receivers.

7. A range-only multistatic radar system as defined in claim 6 wherein said square has a side of about three kilometers.

* * * * *